June 23, 1959  W. Z. RITCHIE  2,891,677
BREAD LOAF DISPLAY RACK
Filed Oct. 5, 1953  3 Sheets-Sheet 2

INVENTOR.
Wilbrod Z. Ritchie
BY Stuehl Wells
Atty.

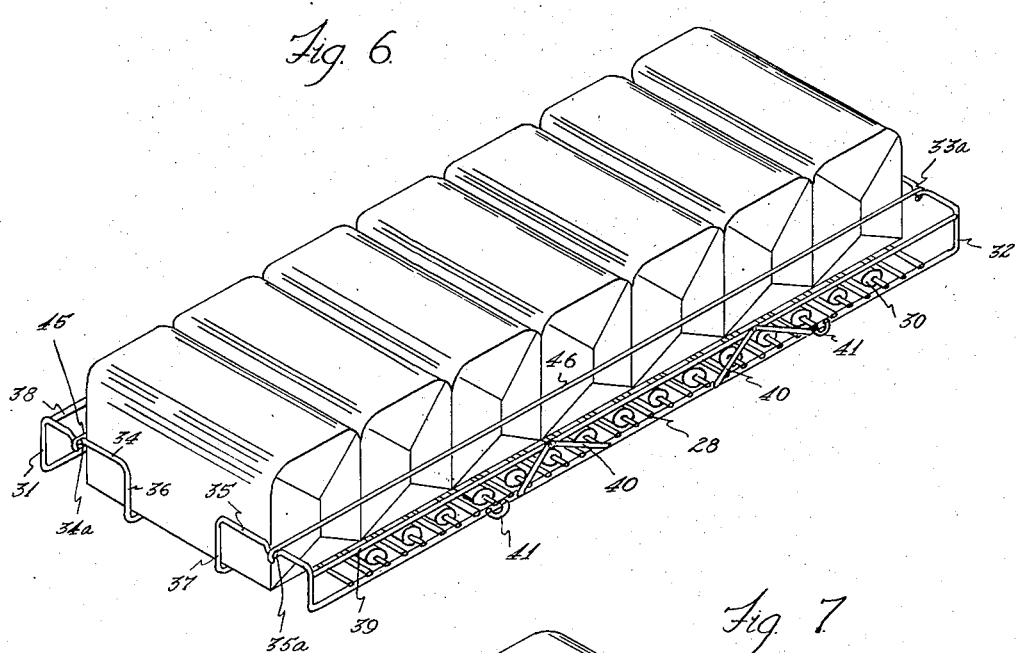
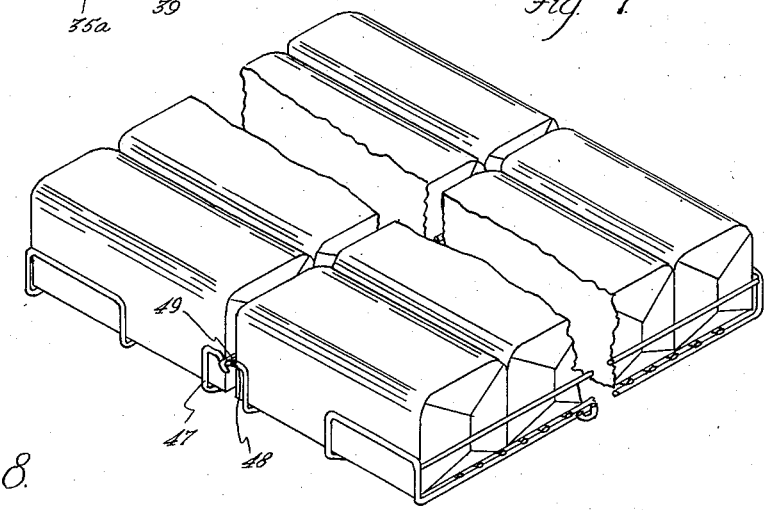
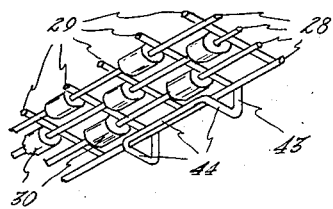
INVENTOR.
Wilbrod Z. Ritchie
BY
Atty

United States Patent Office 2,891,677
Patented June 23, 1959

2,891,677

BREAD LOAF DISPLAY RACK

Wilbrod Z. Ritchie, Spokane, Wash.

Application October 5, 1953, Serial No. 384,249

4 Claims. (Cl. 211—49)

My invention relates to a bread serving and display stand for use in retail groceries where the bread is displayed so that the customer can serve himself. It is the principal purpose of my invention to provide a device of this character wherein a simple open stand supports a plurality of shelves in a sloping position so that loaves of bread supported on the shelves will slide down toward the front and a loaf will always be visible to the customer at the front end of each shelf and can be easily removed.

The nature and advantages of my invention will appear more fully from the following description and the accompanying drawings which illustrate a preferred form of the invention. It should be understood however, that the drawings and description are illustrative only and are not intended to limit the scope of the invention except insofar as it is limited by the claims.

In the drawings:

Figure 6 is a perspective view showing the tray provided with means to adapt it for 1 pound loaves;

Figure 7 shows the tray modifications necessary to adapt the tray for one "Pullman" size loaf or two pound size loaves in each row; and Figure 8 is a partial bottom view of the rear end of a tray illustrating the catches on the cross bar of the frame.

Figure 1:
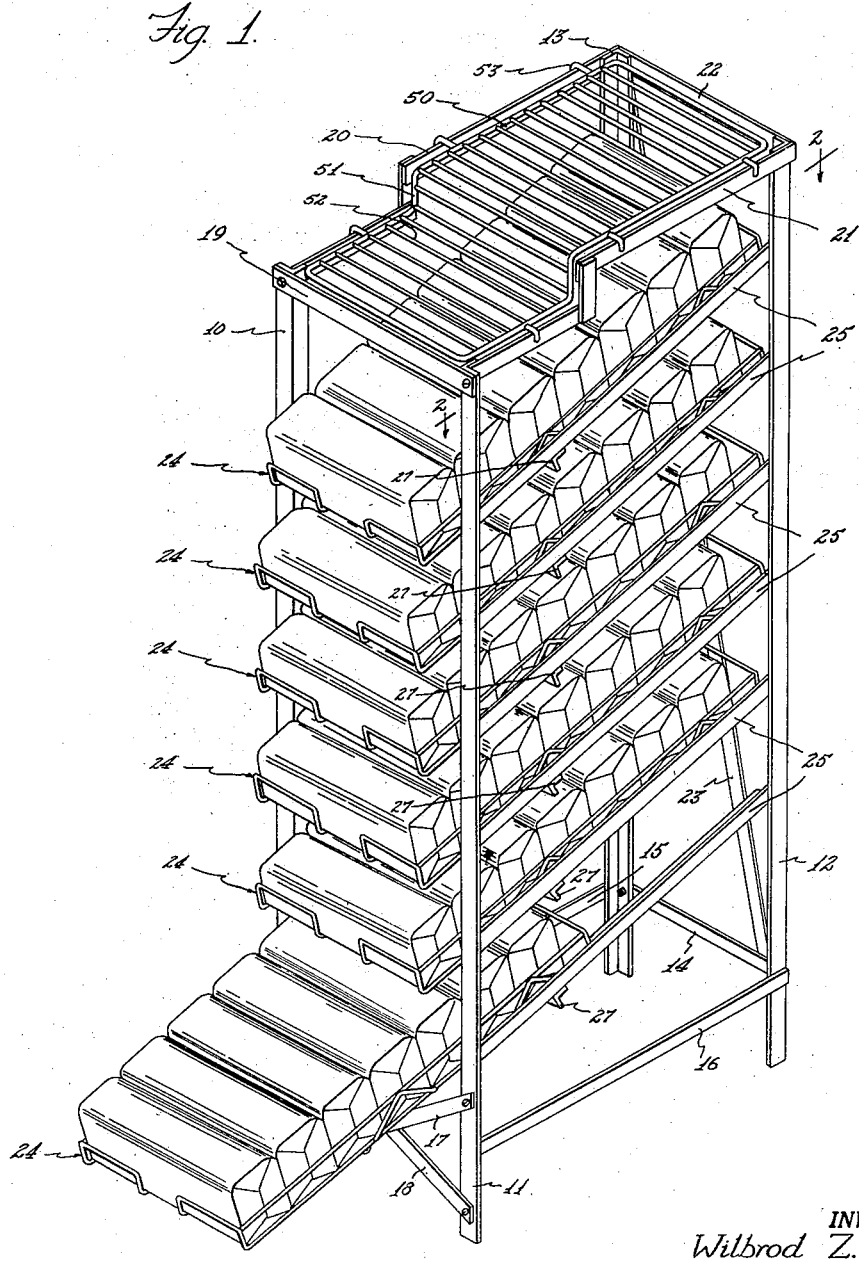
Figure 1 is a perspective view of a bread serving and display stand made according to my invention.

Referring now in detail to the drawings, my invention utilizes a skeleton framework composed of four uprights 10, 11, 12 and 13 of angle iron. The uprights are connected at the bottom by a rear cross bar 14 and two side bars 15 and 16 which are secured to the uprights a short distance above the lower ends thereof. The front uprights 10 and 11 are connected at the bottom by cross bars 17 and 18 and at the top by a cross bar 19. Stepped side bars 20 and 21 connect the tops of the uprights 10 and 11 with the tops of the rear uprights 13 and 12 respectively. A rear cross bar 22 connects the tops of the uprights 12 and 13 and a diagonal brace 23 connects the top of the upright 13 with the lower portion of the upright 12. This open framework is of such nature that a series of frameworks can be placed side by side with a minimum loss of space.

The front uprights 10 and 11 have their front flanges extending outwardly so as to make the entire space between the uprights available for reception of the bread trays. I mount a plurality of bread trays 24 in the framework by providing at both sides of the framework a plurality of evenly spaced sloping angle irons 25. These angle irons extend forwardly and downwardly from the rear uprights 12 and 13 at an angle of about 20 degrees to the horizontal. The angle irons 25 have their flanges 26 extending inward toward each other to form supporting guides on which the trays 24 can slide. At each level the two opposed guides 25 are connected by a cross bar 27. The cross bar 27 is adapted to serve as a stop means cooperating with the trays 24 to hold them from sliding out of the framework and to permit them to be held in two different positions, one for initially loading the bread and the other for normal use.

Figure 2:
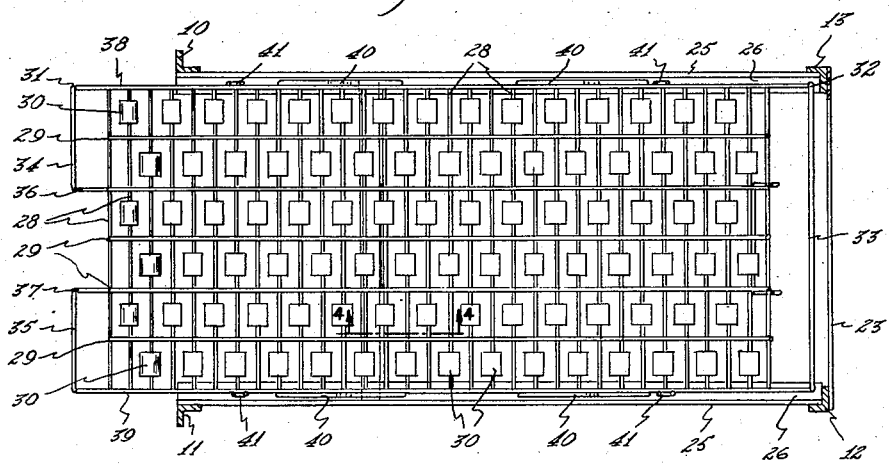
Figure 2 is a plan sectional view taken substantially on the line 2—2 of Figure 1.

The particular details of the bread trays 24 are illustrated best in Figures 2 to 5 inclusive. Each tray comprises a rectangular grid of cross rods 28 and longitudinally running rods 29. The rods 28 and 29 are fixed to each other by welding or soldering wherever they cross. The rods 28 with the exception of the two rods at the ends, form axles which carry rollers 30 at intervals throughout their length, the rollers 30 being staggered on adjacent rods 28 as illustrated in Figure 2 of the drawings. These rollers 30 may be of any suitable material such as a clear plastic composition which can be readily kept clean.

Figure 3:
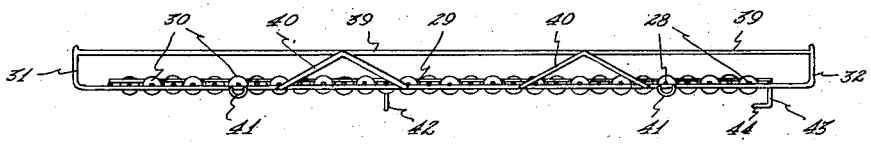
Figure 3 is a view in side elevation of a bread tray used in the stand.
Figure 5:
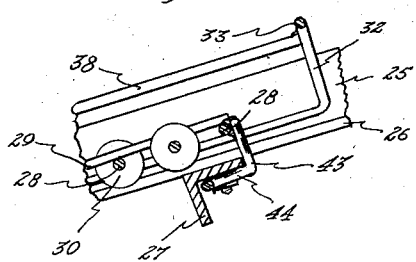
Figure 5 is a view similar to Figure 4 but showing the tray moved forward so that the rear hook on the tray catches the cross bar of the frame.
Figure 4:
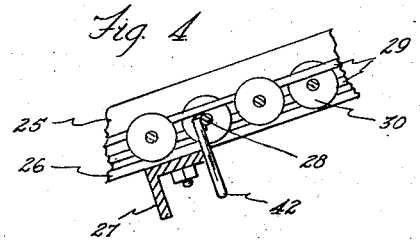
Figure 4 is an enlarged fragmentary sectional view taken on the line 4—4 of Figure 2.

The longitudinal rods 29 at the sides of the tray have upturned ends 31 and 32. The up-turned ends 32 are connected at their upper ends by a cross rod 33 at the rear of the tray. At the front of the tray the up-turned ends 31 are connected by short cross rods 34 and 35 to up-turned ends 36 and 37 on the two intermediate longitudinal rods 29. Side rails 38 and 39 connect the up-turned ends 31 with the up-turned ends 32. These side rails are braced by diagonal braces 40 as illustrated in Figure 2. The outer longitudinal rods 29 are placed beneath the cross rods 28 as illustrated in Figures 3, 4 and 5, while the intermediate longitudinal rods 29 are placed over the cross rods 28. The intermediate rods 29 thus provide surfaces above the roller axles to keep the bread wrappers from catching on the axles between rollers. Each of the outside longitudinal rods 29 is provided with small loops 41 at spaced intervals to serve as shoes that ride on the flanges 26 of the supporting guides 25. The front cross rods 34 and 35 and the rear cross rod 33 provide handles at the ends of the trays and raised end members to limit the movement of the bread loaves out of the trays.

The manner of holding the trays in the framework is quite simple. Intermediate the ends of the tray a depending loop 42 is formed by attaching a piece of rod bent to U-shape to one of the cross rods 28 in such a position that the U-shaped loop 42 will engage a cross bar 27 when the trays are in the position illustrated for the five upper trays in Figure 1. In order to stop a tray in the position shown for the lower tray in Figure 1, the rear cross bar 28 carries a rod loop 43, the legs of which are L-shaped as shown in Figure 5 to provide a horizontally extending portion 44 to hook under the cross bar 27 and prevent the rear end of the tray from tipping up when the bread is loaded on it.

Loaves of bread are usually made in three standard sizes. The one pound loaf is approximately 8½ inches long, the pound and a half loaf is about 12 inches long and the large "Pullman" size loaf is about 17 inches long. Figures 6 and 7 of the drawings illustrate the tray modifications that are made to adapt the trays to the pound loaves and the "Pullman" loaves. Ordinarily the bread is sold in the pound and one-half size and the trays for this size are illustrated in Figure 1. In order to adapt a tray to hold the one pound size, a tray such as that illustrated in Figures 2 to 6 has small depressions 33a, 34a, and 35a formed in the cross rods 33, 34 and 35 in order to secure longitudinally running rods 45 and 46 to the cross rods 33, 34, and 35 to keep the pound loaves centrally disposed on the tray. Where there is sufficient demand for the "Pullman" size and the one pound size, a wider framework is constructed and this is utilized with a wider tray such as that shown in Figure 7, the construction of the tray being essentially the same except that an auxiliary raised front loop 47 is provided on the tray and this loop has a notch 48 to receive a dividing rod 49 that is used only when the wide tray is filled with one pound loaves. When the wide tray is used for "Pullman" loaves, the rod 49 is removed.

The top portion of the display stand is adapted to be used for the display of pastry, cakes etc. For this purpose a rack 50, constructed as shown in Figure 1, is utilized. The rack 50 has an outer closed loop 51 which is bent to conform to the shape of the side frames 20 and 21. Cross rods 52 connect the sides of the loop 51 and supporting fingers 53 mount the loop 51 on the side frames 20 and 21.

It is believed that the construction of my improved bread serving and display stand will be clear from the foregoing description. When the stand is used in a store, the bread is placed in the trays 24 when it is delivered to the store by moving each tray out to the position shown for the lower tray 24 in Figure 1. In this position the loaves can be placed in the tray and moved back by hand or by lifting the front of the tray until the tray is filled. Each tray from the bottom tray upward is filled in this same fashion to completely load the entire stand. It is not necessary for the operator to get behind the stand or to either side of it in order to load it. Any tray can be lifted out entirely so that the trays may be loaded at the bakery and brought to the retail establishment and placed in the stand. By arranging the trays and the supporting guides 25 at approximately a 20 degree angle to the horizontal, the loaves on the trays will work forward as loaves are taken from the front of the trays by the customers. The front loaf of each tray is always visible to the customer for selection of the kind of bread desired.

Having thus described my invention, I claim:

1. A tray for open front display stands for loaves of bread comprising a bottom framework, front and back raised horizontal end members connected to said bottom framework, upstanding side rails joined to said end members and to said bottom framework, rollers rotatably mounted in said bottom framework by axles parallel to the end members, said end members having rod seats therein spaced above the bottom framework and a divider rod removably seated in said seats and held thereby spaced above the bottom framework and extending from the front to the back of the tray.

2. A tray for open front display stands for loaves of bread comprising a bottom framework, front and back raised horizontal end members connected to said bottom framework, upstanding side rails joined to said end members and to said bottom framework, rollers rotatably mounted in said bottom framework by axles parallel to the end members, said framework comprising longitudinal frame elements extending from the front end members to the rear end members and having their top surfaces above the roller axles the rollers being arranged in rows that extend from end member to end member, the rollers in each row being staggered with respect to the rollers in the adjacent row, the side rails having bottom members below the roller axles, said end members forming handles for lifting the trays.

3. In means to display loaves of wrapped bread in tiers inclined upwardly from front to back one above the other so that the bread loaves are moved by their own weight to the lower front ends of the tiers as the front loaves are removed comprising a framework provided with opposed pairs of inclined tray guides, and trays having side rails carried by said guides, the improvement comprising front and back raised horizontal end members on each tray, an open work tray bottom in each tray carried by said side rails and end members and made up of spaced parallel frame elements running from front to back and fixed to said end members, roller axles beneath the tops of said frame elements and extending parallel to the end members, the axles having rollers thereon, the top surfaces of which project above all of said frame elements whereby to support loaves in the tray entirely on said rollers for free movement to the front end member.

4. The invention defined in claim 3 wherein the end members have rod seats therein spaced above the tray bottom and a spacer rod extends lengthwise of the tray spaced above the rollers and has its ends supported by said seats.

References Cited in the file of this patent

UNITED STATES PATENTS

| | | |
|---|---|---|
| 774,291 | Thorpe | Nov. 8, 1904 |
| 915,066 | Birely | Mar. 16, 1909 |
| 921,694 | Hall | May 18, 1909 |
| 1,114,455 | Fisher | Oct. 20, 1914 |
| 1,189,371 | Lyons | July 4, 1916 |
| 1,306,257 | Horix | June 10, 1919 |
| 1,563,116 | Tinsley | Nov. 24, 1925 |
| 1,872,733 | Greenwald | Aug. 23, 1932 |
| 2,021,114 | Freund | Nov. 12, 1935 |
| 2,055,038 | McKean et al. | Sept. 22, 1936 |
| 2,094,401 | Girl | Sept. 28, 1937 |
| 2,119,700 | Burgess | June 7, 1938 |
| 2,239,369 | Nauert | Apr. 22, 1941 |
| 2,239,482 | Cocks | Apr. 22, 1941 |
| 2,289,751 | Brenholt | July 14, 1942 |
| 2,554,232 | Young | May 22, 1951 |

FOREIGN PATENTS

| | | |
|---|---|---|
| 679,021 | Great Britain | Sept. 10, 1952 |
| 832,381 | France | June 27, 1938 |